Jan. 22, 1963   L. N. BOLMGREN   3,075,130
TEMPERATURE CONTROL APPARATUS WITH ADJUSTABLE CYCLING
Filed May 25, 1959   2 Sheets-Sheet 1
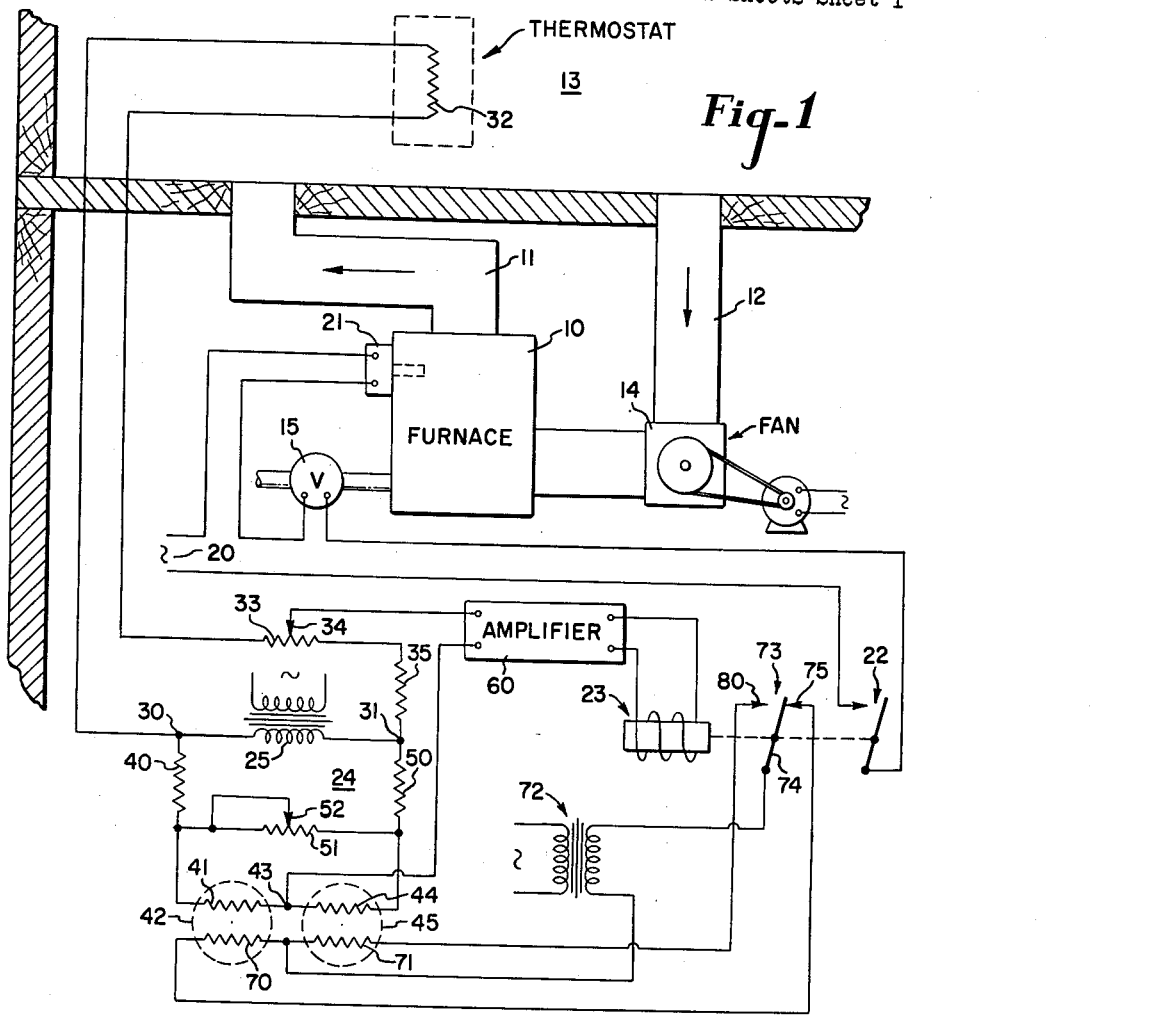
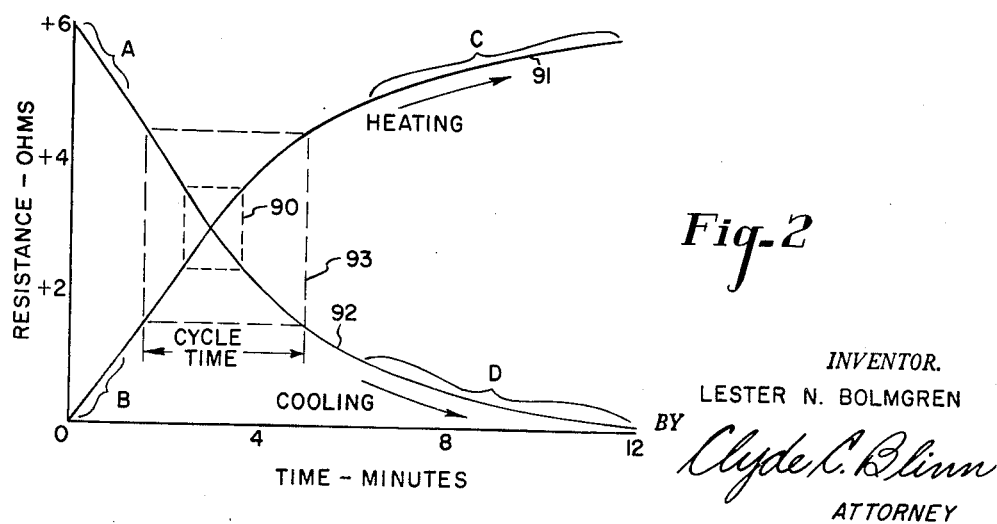
INVENTOR.
LESTER N. BOLMGREN
BY
Clyde C. Blinn
ATTORNEY

INVENTOR.
LESTER N. BOLMGREN

ATTORNEY

United States Patent Office 3,075,130
Patented Jan. 22, 1963

3,075,130
TEMPERATURE CONTROL APPARATUS WITH ADJUSTABLE CYCLING
Lester N. Bohmgren, Richfield, Minn., assignor to Minneapolis-Honeywell Regulator Company, Minneapolis, Minn., a corporation of Delaware
Filed May 25, 1959, Ser. No. 815,550
2 Claims. (Cl. 317—153)

The present invention is concerned with an improved temperature control system; in particular, an electrical network circuit for controlling a relay and associated temperature changing apparatus having a cycling means which can be adjusted to provide various cycling times.

In temperature control systems using electrical network circuits, a cycler for providing cyclic operation of the controlled apparatus is quite conventional as shown in the Wilson et al. Patent 2,572,293. Such a cycler has generally been made up of a temperature responsive resistance element, which is connected in the network circuit, and a heater thermally associated with the resistance element which is controlled by the main control relay. Whenever the main control relay is energised by an unbalance of the network circuit, the cycler heater is energized, and the temperature responsive element is heated to bring the bridge circuit back into a balance state by overcoming the effect of the temperature responsive impedance element or thermostat. Since such cyclers depend upon the matching of their heating and cooling characteristic to provide an equal on and off time at the control point, the cycling characteristic cannot be changed by changing the value of the heater. The cooling characteristic of the heater remains the same regardless of the size of the heater.

The present invention is concerned with an improved cycler which provides adjustment of the cycler effect over a wide range to maintain an equal on and off period at the balanced condition of the network circuit. Furthermore, the present invention provides a cycler which has ambient compensation and practically no drift during its operation period.

An object of the present invention is to provide an improved temperature control system.

Another object of the present invention is to provide a cycler for an electrical network circuit which is adjustable over a relatively wide range and still maintaining an equal on and off period at the balanced condition of the network circuit.

These and other objects of the present invention will become apparent upon a study of the specification and drawing of which:

FIGURE 1 is a schematic representation of the temperature control apparatus as applied to one particular type of condition changing apparatus.

FIGURE 2 is a graphical representation of the resistance versus time characteristic of the cycler shown in FIGURE 1.

Figure 3:
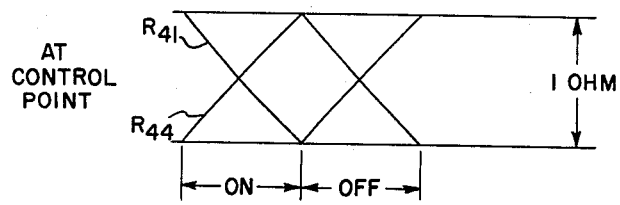
FIGURE 3 is a graphical representation of the effect of the cycler on the network circuit at the balanced condition of the network circuit.

Referring to FIGURE 1, a conventional furnace 10 is shown connected by a supply duct 11 and return duct 12 for delivering conditioned air to a space 13. The air is forced through the furnace by a fan 14. Heat is supplied to the furnace by burning fuel which is controlled by a fuel valve 15. Valve 15 is connected to a conventional source of power through a series circuit comprising a conventional high limit control 21 and a switch 22 of a control relay 23. When switch 22 is closed, valve 15 opens to allow fuel or gas to pass to the furnace 10.

A network circuit 24 is of a conventional bridge type having a source of power from a secondary 25 of a conventional transformer. Two branches are connected in parallel between the secondary output terminals 30 and 31. A first branch as traced from terminal 30 comprises: a temperature responsive impedance element 32 responsive to the temperature of space 13, a resistance 33 having an adjustable tap 34 which separates the first branch into two adjacent legs, and a resistor 35. The other branch as traced from terminals 30 to 31 comprises, a resistor 40, a temperature responsive resistance element 41 of cycler 42, an output tap 43 which separates the other branch into two adjacent legs, a temperature responsive resistance element 44 of cycler 45, and a resistor 50. Connected in parallel with the series circuit including resistors 41 and 44 is a resistor 51 having an adjustable shorting tap 52.

The output of network circuit 24 as obtained between adjustable tap 34 and tap 43 is connected to the input of a conventional amplifier 60. Amplifier 60 has its output connected to relay 23; so that, upon an unbalance of network circuit 24 in a predetermined sense, a voltage is available to energize winding 61 of relay 23 to close switch 22. A heater 70 contained in the housing of cycler 42 is thermally associated with resistance 41; so that, upon the energization of heater 70, the resistance of element 41 increases. A similar heater 71 is thermally associated with element 44 in the housing 45. Heaters 70 and 71 are connected to a source of power 72 by means of a switch 73 which has a movable member 74 and contacts 75 and 80. When member 74 engages contact 75 as shown, heater 70 is energized. When movable member 74 engages contact 80 upon the energization of relay 23, heater 71 is energized.

The normal operation of the temperature control system is with an equal on and off period for the condition changing device or fuel valve 15. In this manner the furnace receives pulses of heat to maintain the space temperature at the control point of the thermostat. For example, if the thermostat was calibrated to maintain a temperature of 72° F. in space 13, relay 23 is cycled on and off to have equal on and off periods. When the network circuit 23 is unbalanced in one direction, amplifier 60 receives a signal to energize relay 23. Switch 73 operates to energize heater 71 to cycle 45 and de-energize heater 70 of cycler 42. Network circuit 24 is then brought into a balanced condition by the change in the resistance of elements 44 and 41. The resistance of element 44 increases and the resistance of element 41 decreases. As soon as the network circuit becomes balanced, relay 23 is de-energized and the cyclers affect the network circuit in the opposite manner to bring about the unbalanced condition. Without any change in the resistance of the thermostat element 32, a cyclic operation of relay 23 takes place to provide pulses of heat to furnace 10.

Referring to the graphical representation of the resistance shown as a function of time in FIGURE 2, the change in resistance of either element 41 or 44 of the identical cyclers 42 and 45, respectively, is shown during heating (curve 91) and during cooling (curve 92). For one particular setting of wiper 52 to select a cycling time as determined by the resistance change required to drive the amplifier through the differential of the amplifier, the heating and cooling characteristics are selected as the portions of the curves 91 and 92 inside the square 90. The cycling time is shown as the lower horizontal side of the square 90 extending between heating 91 and cooling curve 92.

The cycling operation is shown in FIGURE 3 by extracting the portion of the curve contained in the square 90 of FIGURE 2. The wiper 52 has been set to require a total of two ohms resistance change to cycle the amplifier. The resistance of element 41 designated as R41 is shown to drop along the cooling curve for a one ohm change, and the resistance of element 45 designated by R44 increases along the heating curve for a one ohm change. This provides the on operation of the relay 23. The on period extends for a time until the network circuit 24 becomes balanced to de-energize relay 23. When relay 23 is de-energized, the resistance of element 41 begins to increase along the heating curve 91 as shown in FIGURE 2 while the resistance of element 44 decreases along the cooling curve 92. Since the heating and cooling curves are substantially straight lines in the portion used, the on and off period of operation is substantially equal at the control point or balanced operation of the network circuit.

When the wiper 52 is moved to the right to decrease the effect of the cyclers 42 and 45 on the network circuit, the cycle time is increased since a greater resistance change is necessary to drive the amplifier through its differential. The adjustment is graphically shown by the square 93 in FIGURE 2; however, since the portions of the heating and cooling curve used are substantially straight lines the length of the on and off time remains substantially equal at the control point of the network circuit. By the adjustment of wiper 52 the cycling rate of the valve 15 can be changed. Longer on periods and longer off periods are obtained and thus the number of cycles per hour in the furnace operation is changed.

Heretofore, where a single cycler unit is used in a network circuit such as shown in the Wilson Patent 2,572,293, the heating rate of the temperature responsive resistance element is changed to obtain different cycling rates. The cooling rate remains fixed; therefore, a difference in the rate of heating and cooling could exist. The Wilson cycler would vary the lengths of the on and off periods when the rate of cycling was changed. In the present invention, at the control point, an adjustment of wiper 52 to vary the cycling rate maintains the length of the on and off periods of operation substantially equal.

Figure 4:
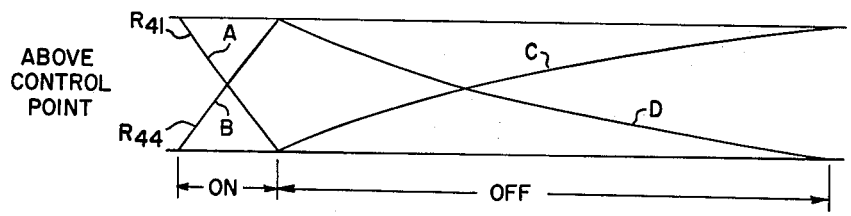
FIGURE 4 is a graphical representation of the effect of the cycler on the network circuit at an unbalanced condition above the control point.

In FIGURE 4 the operation is graphically shown for the case when the space temperature has increased above the control point and a two ohm resistance change is necessary to cycle relay 23. The resistance of element 32 increases to unbalance the bridge circuit in such a manner to de-energize relay 23. As soon as the cyclers 42 and 45 restore the network circuit back to balance, the relay 23 is energized. When relay 23 is energized, the resistance of element 41 decreases along a curve R41 shown in FIGURE 4 and the resistance of element 44 increases along the curve shown as R44. R41 is the cooling curve selected from the portion A of curve 92 shown in FIGURE 2, and the curve R44 is the heating curve selected from the portion B of heating curve 91 in FIGURE 2. As soon as the relay 23 is de-energized, the resistors 41 and 44 change values as shown by curves C and D selected from the heating and cooling curves respectively of FIGURE 2.

Figure 5:
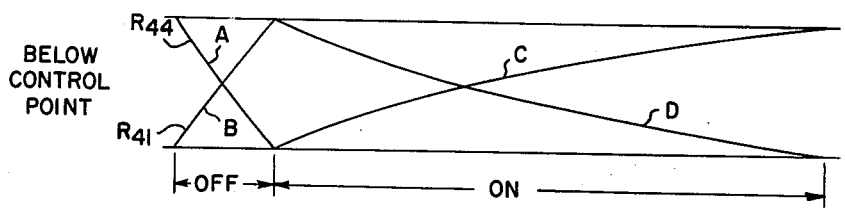
FIGURE 5 is a graphical representation of the effect of the cycler on the network circuit at an unbalanced condition below the control point.

When the temperature of element 32 is below the control point and the space 13 is cool, network circuit 24 is unbalanced to energize relay 23. As soon as the cyclers 42 and 45 restore balance to the network circuit, relay 23 is de-energized and the valve 15 is turned off. At the beginning of the off cycle, the resistance of element 44 decreases along the curve R44 which is shown in FIGURE 5. The resistance of element 41 increases along curve R41. The curves A and B are obtained from the cooling and heating curves, respectively, of FIGURE 2. Assuming the space thermostat is not satisfied, the unbalanced condition of network circuit is restored to terminate the off cycle by energizing relay 23. Elements 44 and 41 are then heated and cooled, respectively along the curves C and D which are selected from the heating and cooling curves of FIGURE 2.

From FIGURES 4 and 5, the difference between the lengths of the on and off cycles if shown. When the resistance of element 32 senses a deviation in the space temperature away from the control point, the lengths of the on and off cycles are adjusted depending upon whether the temperature is above or below the control point. At the control point, the lengths of the on and off cycles are equal, and as mentioned heretofore, the length of the cycle can be adjusted by adjusting wiper 52. If the length of the cycle is adjustable to be longer at the control point, the relative length of the cycler above and below the control point will be proportionally changed.

One of the inherent faults in the cycler of the Wilson patent is the so-called "drift." The drift is a change in the calibration of the network circuit which is a result of the increased average temperature of the cycler during the initial operation. When the control system is first energized, the cycler is cool; however, as the cycler continues to operate to cycle the control relay, the average temperature of the cycler increases to some steady state value. Whenever the cycler timing is changed, a steady state operation must be attained before the network circuit can be calibrated.

In the present control system of FIGURE 1, drift is no problem as the two cycles 42 and 45 are connected in adjacent legs of the network circuit to compensate each other. If one cycler has any drift, the other cycler will have the same drift, and the resulting effect on the network circuit is zero.

In the control system of the Wilson patent, the effect of the ambient temperature on the network circuit and the cycler is compensated for by an ambient temperature compensation resistor. The resistor changes in temperature as the ambient temperature changes to cancel out any effect of the ambient temperature on the cycler. The present control system needs no separate ambient temperature compensation resistor as the two cyclers 42 and 45 are equally affected by any change in the ambient temperature.

While the applicant has one particular disclosure for his present invention, the invention is obviously applicable to other condition controlling systems; therefore, the applicant intends to only limit the scope of his invention by the appended claims.

I claim:

1. In a temperature control system, an electrical bridge network circuit having output terminals whereby an output voltage is available between said terminals when said network circuit is unbalanced, space temperature responsive impedance means connected in said network circuit, said impedance means being adapted to respond to the temperature of a space, an amplifier, relay means, at least one source of power, circuit means connecting said source to said bridge, connection means connecting said output terminals to said relay means whereby said relay means is energized when a predetermined output is available from said bridge circuit, said relay means being adapted to control a space temperature changing apparatus, said relay means having a first and a second switch controlled thereby, said first switch being closed when said relay means is energized, said second switch being closed when said relay means is de-energized, a first and a second temperature responsive impedance connected in series with additional impedance means forming a branch of said bridge, one of said outputs being between said first and second impedances whereby said branch has said first impedance in one leg of said network circuit and said second impedance in another leg of said network circuit, said first and second responsive means affecting said output in opposite sense upon an increase in the temperature of said first and second responsive means, a first and a second electrical heater means thermally associated with said first and second impedances, respectively, connection means including said first and second switches for connecting said first and second heater means, respectively, to said source of power, said first and second impedance being effective upon an unbalance of said network to restore a balanced condition even though said space temperature responsive impedance means is not at the desired temperature whereby a cyclic pattern of operation is provided, single manually variable impedance means, means connecting said variable impedance means in parallel with said series connected impedances to select the effectiveness of said first and second impedances on said output whereby the cyclic operation of said relay means can be adjusted.

2. In a temperature control system having an adjustable cyclic operation pattern, an electric network circuit of the bridge type having output terminals and power input terminals whereby an output is produced when an unbalance occurs by a change of the impedance between two legs of said circuit, at least one source of power, relay means connected to said output terminals, said relay means when energized having a first normally closed switch and a second normally open switch, said relay means being adapted to control a temperature changing apparatus, space temperature responsive means connected to said network circuit and being adapted to cause operation of said relay means, a first impedance, first temperature responsive impedance cycler means, circuit means connecting said first impedance and said first cycler means in one leg of said circuit, first heater means thermally associated with said first impedance means, means including said first switch for connecting said first heater to said source of power whereby upon heating said first impedance, said network circuit upon having a predetermined unbalance is driven toward a balanced condition, a second impedance, second temperature responsive cycler means, circuit means connecting said second cycler means and said second impedance in a second leg of said circuit to effect said output opposite to the effect of said first responsive cycler means, second heater means thermally associated with said second impedance means, means including said second switch for connecting said second heater to said source of power whereby upon heating said second impedance said network circuit is driven toward an unbalanced condition, single adjustable resistance means, means connecting said resistance means in parallel with said first and second temperature responsive cycler means to simultaneously select the effect of said first and second responsive cycle means on said output, said output being unaffected by a change in the ambient temperature surrounding said first and second temperature responsive means at any value of said adjustable resistance means.

References Cited in the file of this patent
UNITED STATES PATENTS

| | | |
|---|---|---|
| 2,148,491 | Moore | Feb. 28, 1939 |
| 2,325,308 | Davis | July 27, 1943 |

FOREIGN PATENTS

| | | |
|---|---|---|
| 444,673 | Great Britain | Mar. 25, 1936 |
| 508,266 | Great Britain | June 28, 1939 |